E. L. & E. W. CLARK.
VEHICLE.
APPLICATION FILED NOV. 29, 1912.
1,122,686.
Patented Dec. 29, 1914.
2 SHEETS—SHEET 1.
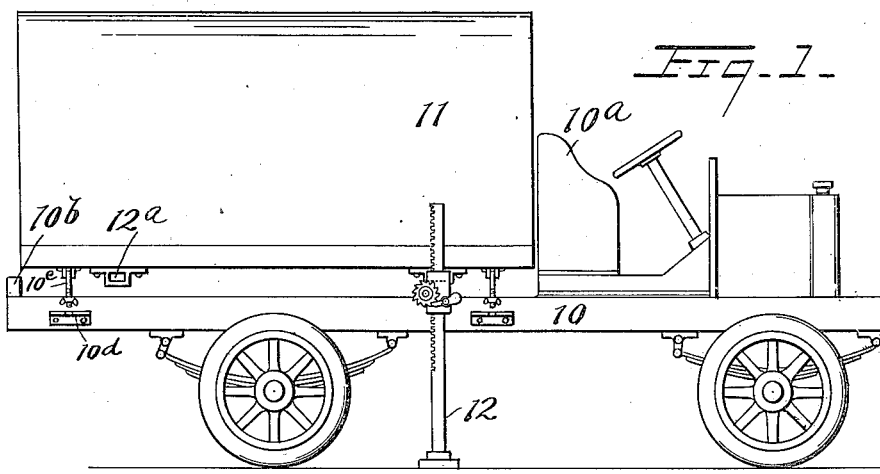
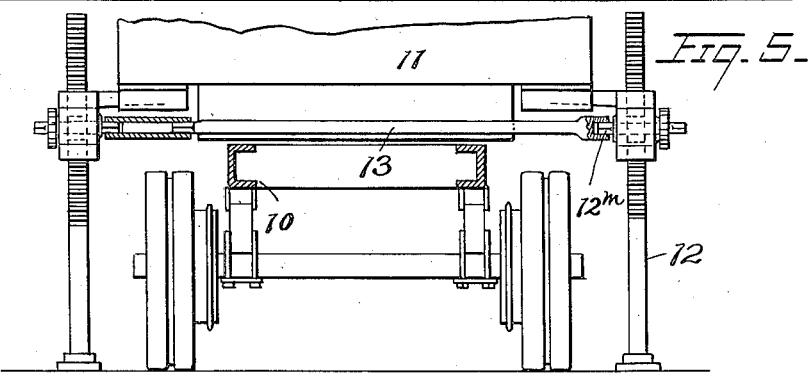
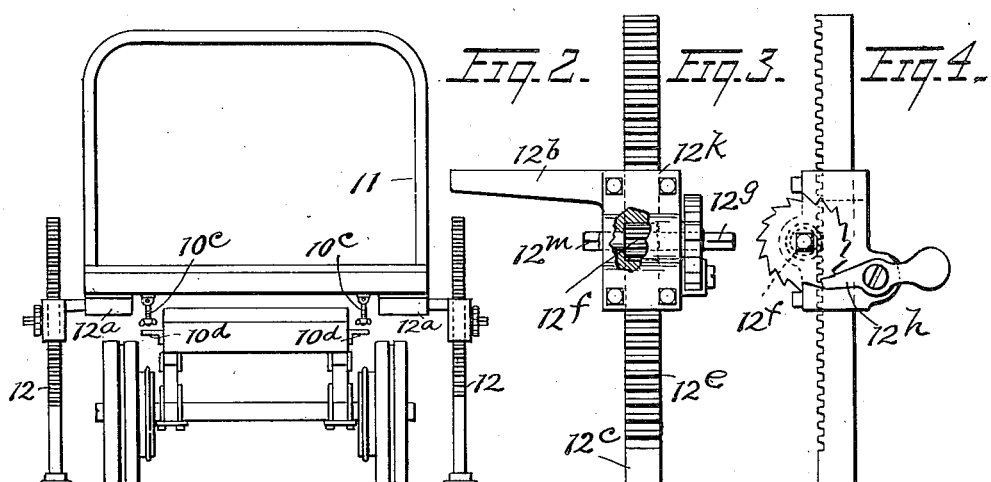
Witnesses
E. B. Gilchrist
H. L. Brennan
Inventors
Emerson L. Clark
and
Earl W. Clark
by Thurston & Kwis Attys.

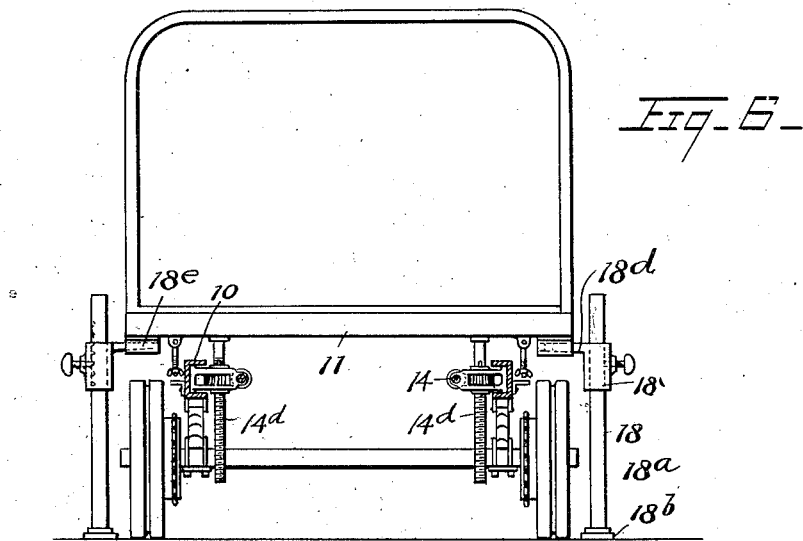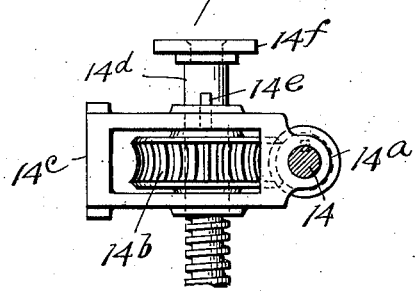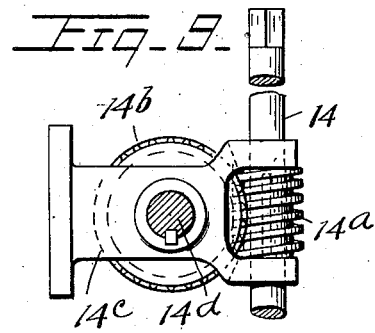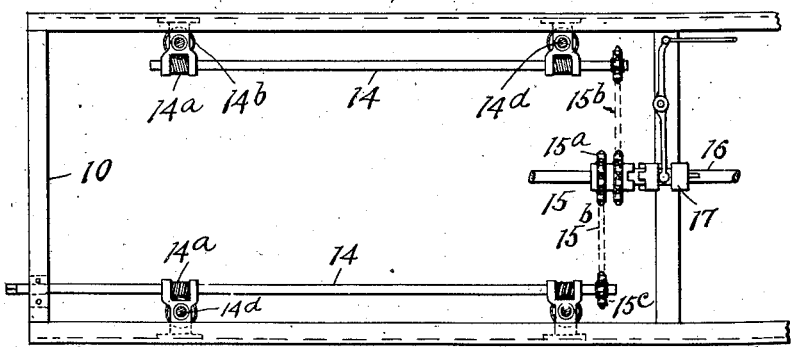

UNITED STATES PATENT OFFICE.

EMERSON L. CLARK, OF LAKEWOOD, OHIO, AND EARL W. CLARK, OF SHARON, PENNSYLVANIA.

VEHICLE.

1,122,686.   Specification of Letters Patent.   Patented Dec. 29, 1914.

Application filed November 29, 1912. Serial No. 734,079.

*To all whom it may concern:*

Be it known that we, EMERSON L. CLARK and EARL W. CLARK, citizens of the United States, and residents, respectively, of Lakewood, in the county of Cuyahoga and State of Ohio, and Sharon, in the county of Mercer and State of Pennsylvania, have invented a certain new and useful Improvement in Vehicles, of which the following is a full, clear, and exact description.

This invention relates to certain improvements in vehicles, particularly motor driven trucks, which are utilized in transporting freight or merchandise.

It is a well known fact that in the transportation or moving of merchandise, very often a great amount of time is required in loading and unloading the vehicle. This is true particularly with certain kinds of merchandise, such as household goods which are required to be loaded and unloaded with great care. As a matter of fact, it is frequently the case that of the entire time required in the transportation of merchandise from one locality to the other, by far the greatest proportion of time is used in the loading and unloading processes. Consequently, the time consumed in loading and unloading is a very large factor in the cost of transportation. This is particularly true when motor driven trucks are employed in transporting merchandise, not only because of the large amount of money invested in the truck, but also because in many instances, the truck driver is paid higher wages than those ordinarily engaged in transporting merchandise with vehicles used prior to the advent of the motor driven truck. It will be apparent therefore that if the truck can be utilized, while the merchandise is being loaded into or unloaded from the truck body, not only is the efficiency of the truck service improved, but if one truck chassis be utilized with a plurality of bodies, in a manner such that the chassis can be used in conveying a loaded or unloaded body, while one or more bodies are being loaded and unloaded, the cost of transportation is considerably decreased.

The present invention has for its object the provision of means whereby the above mentioned desirable desiderata are attained.

More specifically, the invention aims to provide means whereby a truck chassis can be effectively employed with several truck bodies, which can be detachably supported on the chassis, together with means whereby a body may be disconnected and raised from the chassis, and firmly supported from beneath the body, so that the chassis may be removed from beneath the body and employed in connection with one or more other bodies, while the body thus supported independently of the chassis can be loaded with merchandise or unloaded. Thus, while one body is being loaded or unloaded, a chassis can be used in conveying either a loaded or unloaded body to a point where it can receive or be relieved of the load. In fact it is possible, with our invention, to utilize the chassis to distribute empty bodies at the desired points for loading purposes, and a number of bodies may be placed on the chassis at one time for the purpose of being distributed.

Our invention may be briefly summarized as consisting in certain novel details of construction and combinations and arrangements of parts, which will be described in the specification and set forth in the appended claims.

In the accompanying sheets of drawings, wherein we have shown two forms of our invention, Figure 1 is a side elevation of a truck showing the body raised and supported from the chassis by one form of our elevating and supporting device, parts being removed. Fig. 2 is an end view of the same. Fig. 3 is an enlarged side elevation of the lifting jack shown in Figs. 1 and 2. Fig. 4 is a similar view of the jack turned 90 degrees from the position shown in Fig. 3. Fig. 5 is an end view with the chassis in section, showing a modification by which two jacks on opposite sides of the truck may be simultaneously operated from one point. Fig. 6 is an end view showing the chassis in section,—this view showing a different form of body elevating means, from that illustrated in Fig. 5 and showing the body supported above the chassis. Fig. 7 is a plan view of a portion of the chassis with the elevating means of Fig. 6. Fig. 8 is an enlarged detail view of a part of the body elevating means shown in Figs. 5 and 6; and Fig. 9 is a sectional plan view of the parts shown in Fig. 7.

Referring now to the drawings, and first to Figs. 1 to 5, 10 represents the chassis of a motor truck, and 11 the body; both the chassis and body being of any suitable construction. The term body is used in its broad sense, and is intended to cover the body in the form of a platform, or of the other usual and well known types which are adapted to be loaded with and used in the transportation of freight or merchandise. The principal requisite for the body or rather for the body and chassis, so far as our invention is concerned, is that the body should be detachably connected to the chassis in a manner such that it can be quickly detached and elevated or lowered onto the chassis and secured thereto for the purpose of transportation. As shown in Fig. 1, the body is adapted to be held against endwise movement on the chassis by being lowered between the seat $10^a$, and the retaining strip $10^b$, at the rear end of the chassis, and as shown in Fig. 2, the body can be held against lateral movement on the chassis, and at the same time can be held against movement vertically relative to the chassis by some quick detachable means, such as swinging bolts $10^c$, which in this case are connected to the body and are adapted to interlock with flange members $10^d$, secured along the sides of the chassis. We are not intending, however, to illustrate all the details or even the preferred means for detachably securing the body to the chassis. In accordance with our invention, the chassis is adapted to be utilized with a plurality of bodies, and in order that the chassis may be used with the several bodies, each body is adapted to be elevated from the chassis and supported from the ground or pavement independently of the chassis, and in a manner such that the body is rigidly and securely supported so that it can be loaded or unloaded, and also in such a manner that the supporting means will not interfere with the movement of the chassis, while it is being run under or from under the body. In Figs. 1 to 5, the body is adapted to be elevated and supported by lifting jacks 12. To secure the rigid attachment of the jacks to the body, the body is in this case provided along its sides with tapered socket members $12^a$, each adapted to receive the tapered shank $12^b$ projecting from the movable part of the jack which includes a standard $12^c$, provided with a suitable base $12^d$, and rack teeth $12^e$, adapted to be engaged by a pinion $12^f$, carried by a pinion shaft $12^g$ having an outwardly projecting squared portion, to which a crank may be attached, a suitable ratchet device $12^h$ normally preventing lowering of the body. The tapered shank $12^b$ is carried by a head $12^k$, which carries the pinion and is adapted to be lifted or lowered along the standard $12^c$ in the well known manner. Four of these jacks will ordinarily be sufficient to support the body, two being arranged along each side thereof.

With this arrangement, the body can be lifted from the chassis, and securely supported independently thereof, while merchandise is being placed in or removed from the body; and by reference to Fig. 2, it will be seen that the jacks do not in any way interfere with the movement of the chassis along beneath the body. If desired, after the body has been elevated and the chassis has been run out from beneath the same, the body can be lowered any desired amount to facilitate loading or unloading.

In Fig. 5 there is disclosed means for simultaneously operating two jacks on opposite sides of the truck. As here shown, the inner ends of the pinion shafts $12^m$ of the two opposite jacks are squared, and are connected together by a coupling 13, by which movement of one pinion shaft is transmitted to the other. With this arrangement, there must be sufficient clearance between the body and chassis for the coupling.

In Figs. 6 to 9, we have shown a modification possessing certain advantages over the arrangement shown in the preceding figures. In this case, the chassis is provided with body elevating means, which can be operated either by hand or the power of the propelling engine. In carrying out this part of our invention, the chassis is provided along the sides with a pair of shafts 14, extending lengthwise of the chassis, and each provided with a worm $14^a$ which engages a worm wheel $14^b$, each set of worm and worm wheels being carried by a bracket or head $14^c$, secured to the chassis. Extending through each of the worm wheels $14^b$ is a vertical shaft $14^d$, threaded as shown, and passing through a correspondingly threaded part of the worm wheel, which is adapted to serve as a nut. Each shaft $14^d$ is provided with a spline which engages a key $14^e$ in the corresponding head or bracket $14^c$, so that as the several worm wheels $14^b$ are turned, the shafts $14^d$ will be elevated or lowered. At the upper ends of the shafts $14^d$ are enlarged seats $14^f$ which are adapted to engage the bottom of the body. With this arrangement, the body may be elevated either by hand or the power of the engine, as previously stated. In order that the elevating mechanism may be operated manually, one of the longitudinally extending shafts 14 is provided with a rearward extension, projecting preferably to or beyond the end of the chassis as shown. The extreme end of this shaft may be squared to receive a crank. In order that power applied to one shaft 14 may be transmitted to the other shaft 14, the two shafts are geared together, and in this case, this is accomplished by sprocket gearing 15, including a pair of sprocket wheels $15^a$ secured together and mounted upon the drive shaft 16 of the chassis, and sprocket chains 15ᵇ connecting the sprocket wheels 15ᵃ, with sprocket wheels 15ᶜ secured to the two shafts 14. In order that the power of the engine may be utilized for elevating the body, the drive shaft 16 is provided with a shiftable clutch member 17 splined to the drive shaft so that it may be clutched to or unclutched from the part carrying the two sprocket wheels 15ᵃ. With this type of body elevating means, we provide devices which are designed to support the body independently of the chassis, and serve only for body supporting purposes, and not necessarily for elevating purposes. As shown in Fig. 6, the body is supported from the ground or pavement after the said body is elevated by a plurality of supports or legs 18, each including a standard 18ᵃ with an enlarged base 18ᵇ, and an upper part 18ᶜ which is in this case, although not necessarily so, vertically adjustable relative to the standard 18ᵃ. We prefer the adjustable supporting standard, in order that the body can be supported in a desirable manner, and without the necessity at any time of blocking up one or more of the legs. The parts 18ᶜ of the supporting legs are provided with inwardly projecting tapered shanks 18ᵈ similar to the shanks 12ᵇ of the jacks previously described. These shanks 18ᵈ are adapted to be inserted in tapered socket members 18ᵉ secured to the lower part of the body along the lower side thereof, as in the modification first described, so as to form rigid or firm connections between the body and legs. With this arrangement, the body is elevated above the chassis so that it is free of the latter, and then the supporting legs or standards are placed in position, after which the body may be lowered by the same mechanism which elevated it, until the weight of the body is on the supporting legs. In this instance, as in the first, the body is securely supported, without any danger of the body being thrown over or upset, while it is being loaded or unloaded, and at the same time, the supports while rigidly attached to the body, are out of the path of movement of the truck, which can be moved under or from under the body. It will be seen therefore that our invention is susceptible of considerable modification, the main feature of the invention being the provision of means for elevating the body and rigidly supporting the body independently of the chassis, and from beneath the body, so that the body can be loaded or unloaded, and so as not to interfere with the movement of the chassis to enable it to be taken away from the body, while the latter is supported independently thereof, and used in connection with another body, and so as not to interfere with the movement of the chassis, as it is backed beneath the body, so that the latter can be lowered onto the same.

As will be apparent from the above, it is not essential that the body elevating and body supporting means be incorporated in the same mechanism as is the case with the lifting jacks which both elevate and support the body after it is elevated, but the elevating mechanism may be and in some instances is preferably independent of the supporting means, in which case, the elevating mechanism is preferably carried by the chassis, as above described.

Having thus described our invention, what we claim is:

1. In combination, a vehicle comprising a frame and running gear, a body detachably supported by the frame, with portable means for elevating and supporting the body from beneath the same and independently of the frame, comprising a plurality of supports, each of said supports being adjustable in the direction of its length, and coöperating means on said body and supports for forming temporary rigid connections between the body and supports.

2. In combination, a vehicle comprising a frame provided with running gear, a body adapted to be supported by the frame and detachable therefrom, with portable means for elevating the body above the frame and for supporting the body from beneath the same and independently of said frame, comprising a plurality of independent legs, each of said legs being adjustable in the direction of its length, and coöperating means at spaced points on the body and on the said legs for forming temporary rigid connections between the body and legs, whereby the body may be firmly supported for loading and unloading purposes independently of the frame and running gear.

In testimony whereof, we hereunto affix our signatures in the presence of two witnesses.

EMERSON L. CLARK.
EARL W. CLARK.

Witnesses:
A. J. HUDSON,
A. F. KWIS.